(12) United States Patent
Ishii et al.

(10) Patent No.: US 7,575,272 B2
(45) Date of Patent: Aug. 18, 2009

(54) CONSTRUCTION MACHINE

(75) Inventors: Hajime Ishii, Higashioumi (JP); Shogo Kimura, Ritto (JP); Tomoyuki Tanaka, Moriyama (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 10/588,503

(22) PCT Filed: May 26, 2005

(86) PCT No.: PCT/JP2005/010103

§ 371 (c)(1),
(2), (4) Date: Aug. 4, 2006

(87) PCT Pub. No.: WO2005/121459

PCT Pub. Date: Dec. 22, 2005

(65) Prior Publication Data

US 2007/0132277 A1    Jun. 14, 2007

(30) Foreign Application Priority Data

Jun. 7, 2004    (JP) .............................. 2004-168812

(51) Int. Cl.
*B62D 33/063* (2006.01)
(52) U.S. Cl. .............................. 296/190.04; 296/190.11
(58) Field of Classification Search ............ 296/190.11, 296/146.11, 146.12, 146.13, 190.04; 292/95, 292/121, 122, 108, 44, 54, 216, 210, 304; 160/199, 206, 213, 118
See application file for complete search history.

(56) References Cited

U.S. PATENT DOCUMENTS

| | | | | |
|---|---|---|---|---|
| 3,692,083 A | * | 9/1972 | Swanson et al. | ............ 160/206 |
| 4,035,016 A | * | 7/1977 | Ricca | .................... 296/190.11 |
| 6,471,260 B1 | * | 10/2002 | Weinerman et al. | ......... 292/216 |
| 6,502,896 B1 | * | 1/2003 | Nakata et al. | .......... 296/190.05 |
| 6,669,272 B2 | * | 12/2003 | Ayabe et al. | ............ 296/190.08 |

FOREIGN PATENT DOCUMENTS

| | | |
|---|---|---|
| JP | 1-198929 | 8/1989 |
| JP | 11-100864 | 4/1999 |
| JP | 2004-143687 | 5/2004 |
| WO | 99/61711 | 12/1999 |

* cited by examiner

*Primary Examiner*—Dennis H Pedder
*Assistant Examiner*—Melissa A Black
(74) *Attorney, Agent, or Firm*—Mattingly & Malur, P.C.

(57) ABSTRACT

A folding type door is fitted in a cab box. Two door panels and are disposed substantially in the same vertical plane as a left side cover of an upper revolving structure when said door in a closed position. Catches and are provided in a left rear side section of the cab box. Provided on door panels and of the folding type door are strikers and to be attachably or detachably engaged with the catches and separately of each other. When the folding type door is opened, the respective door panels and are each retained in an open door position by engagement of two sets of strikers and catches and which prevents rattling movements of each door panel to retain the folding type door in a stabilized state.

6 Claims, 13 Drawing Sheets

CONSTRUCTION MACHINE

TECHNICAL FIELD

This invention relates to a construction machine which can be used, for example, as a hydraulic excavator and which is furnished with a cab to be occupied by an operator at the control of the machine.

BACKGROUND ART

Generally, it has been known to provide a cab on a construction machine like a hydraulic excavator. A cab on a construction machine of this sort is often fitted with a door to be opened and closed by an operator (e.g., as disclosed in Patent Literatures 1, 2 and 3 below).
Patent Literature 1: Japanese Patent Laid-Open No. H1-198929
Patent Literature 2: WO99/61711
Patent Literature 3: Japanese Patent Laid-Open No. H11-100864

Prior art hydraulic excavators of this sort are largely constituted by a vehicular lower structure and an upper revolving structure which is rotatably mounted on the vehicular lower structure, and a cab is usually built on a revolving frame of the upper revolving structure. Normally, the cab is in the form of a hollow box-like structure, i.e., the so-called "a cab box" which is constituted by five pillars which are erected in left front, right front, left center, left rear and right rear positions, and five side sections between the five pillars, including front, left front, left rear, right, and rear side sections. A door is openably or closeably fitted between the left front and left center pillars of the cab box.

In the case of prior art cabs which are disclosed in Patent Literatures 1 and 2 mentioned above, a door is formed by a single door panel of a flat plate-like shape, and pivotally hinged to the left center pillar of the cab box in such a way that it can be swung open outward of the cab box.

Further, in the case of Patent Literature 3 mentioned above, a cab is provided with a folding type door having a couple of door panels which are pivotally connected to each other. More specifically, this folding type door is constituted by a first door panel which is pivotally attached to a left center pillar, and a second door panel which is pivotally connected to a front side of the first door panel. When the folding type door is largely opened, a striker which is provided on the outer side of the second door panel is attachably or detachably engaged with a catch which is provided on a left rear section of the cab box. Thus, when it is desired to leave the folding type door in an opened state during an operation of the machine, it can be locked in an open position by opening the door until the striker comes into engagement with the catch on the side of the cab box.

Further, in the case of this prior art folding type door, when the folding type door is closed, the two door panels are retained in a slightly bent form, and a part of a revolving frame under the door is projected sideward of the closed door.

In the case of the prior art cabs in Patent Literatures 1 and 2, a cab door is constituted by a single door panel which can be swung open toward outside. In this connection, considering the possibilities that a cab door is left open during certain machine operations, it is desirable to minimize sideward outrunning of an opened door beyond the width of a vehicle body at the time of laying out or designing the vehicle body, ensuring that an opened door will not obstruct machine operations.

In this regard, it is conceivable to relocate the cab as a whole to the center of a vehicle body. However, considering positional relations with the cab and other structures, the relocation of the cab is feasible only in a limited range which would not be effective for minimizing a sideward outrunning of an opened cab door to a sufficient degree.

Therefore, in the case of the cabs in Patent Literatures 1 and 2, in order to minimize a sideward outrunning of an opened cab door, it becomes necessary to cut the dimensions of a cab itself. In such a case, it becomes difficult to secure a sufficient space within the cab, resulting in deteriorations in operating environment.

Further, in the case of the prior art described in Patent Literature 3, of the two door panels which make up a folding type door, a striker is provided on the second door panel alone and, when the door is opened, brought into engagement with a catch which is provided on the part of a cab box. The first door panel is not fixed to the side of the cab box, so that it is put in rattling or vibratory movements and considerably deteriorated in durability, due to plays in hinges which rotatably support the first door panel.

Furthermore, in the case of the prior art described in Patent Literature 3, a side panel at the outer periphery of a revolving frame is projected beyond an outer side surface of the cab, providing a space for receiving a folded door which is opened state. Therefore, when the machine is used at a working site in a cold district or in winter, snow falls on the projected part of the revolving frame while the machine is operated or parked on a snowing site, to make it difficult to open the door, as a result degrading efficiency of operation. Besides, at the time of a ground excavating operation, soil tend to deposit and accumulate on the projected part of the revolving frame.

DISCLOSURE OF THE INVENTION

In view of the above-discussed problems with the prior art, it is an object of the present invention to provide a construction machine which is arranged to minimize a sideward outrunning of an opened cab door beyond the width of a vehicular body of the machine, permitting to operate the machine smoothly with the cab door in opened state and securing a broader space within the cab to provide an improved working environment.

It is another object of the present invention to provide a construction machine which permits to open and close a cab door smoothly to ensure improved working efficiency, for example, even under snowing weather conditions.

It is still another object of the present invention to provide a construction machine, providing unobstructed rear views for an operator at the control of the machine.

(1) According to the present invention, in order to achieve the above-stated objectives, there is provided a construction machine comprised of an automotive vehicular lower structure, and an upper revolving structure rotatably mounted on the vehicular lower structure and having a cab built on a frame and covering lower side of the cab with a side cover; the cab being constituted by a hollow cab box having five vertically extending pillars including a left front pillar, a right front pillar, a left center pillar, a left rear pillar and a right rear pillar, and five side sections between the pillars including a front side section, a left front side section, a left rear side section, right side section and a rear side section, and a door openably or closeably fitted between the left front pillar and the left center pillar.

The construction machine according to the present invention is characterized in that: the door is a folding type door pivotally supported on the left center pillar of the cab box and constituted by a couple of flexibly connected door panels; the folding type door being located substantially in the same vertical plane as the side cover; the folding type door being provided with a couple of holder members for retaining the folding type door in an open door position when the folding type door is opened; and the folding type door being provided with a couple of catch members to be attachably or detachably engaged with the holder members on the left rear side section of the cab box when the folding type door is in an open door position.

With the arrangements just described, when in a closed position, the folding type door is disposed substantially in the same vertical plane as the side cover which is provided under the folding type door. Accordingly, the left side of the cab box can be located flush with the left side of the frame (the vehicle body) to enlarge the cab size to a maximum within the width of the vehicle body of the machine. That is to say, a broader space can be provided within the cab to improve the operator's working environment without obstructing driving and swinging operations of the machine.

Besides, the folding type door is provided with a couple of holder members to be disengageably engaged with a couple of catch members on the left rear side section of the cab box to retain the folding type door in an open door position in a stabilized state. Namely, the folding type door which is normally easily put in rattle movement can be retained in an open door position in a stabilized state by two sets of holder and catch members which effectively suppress rattling or vibratory movements of the door.

Further, when in a closed position, the folding type door is disposed substantially in the same vertical plane as the side cover of the upper revolving structure, and no stepped surface exists between the folding type door and the side cover. Therefore, for example, even if the door is kept closed in snowing weather conditions, there is no possibility of snow lying on the outer side of the folding type door to such a degree as to hamper opening of the door. Accordingly, even in snowing weather conditions, the door can be opened and closed smoothly to ensure improved working efficiency.

On the other hand, when the folding type door is opened, it can be folded back, for example, along the left rear side section of the cab box. Therefore, even in the case of a cab of a large size, it is possible to locate the opened door within the width of the vehicle body or to suppress the degree of sideward outrunning of the opened door beyond the width of the vehicle body. This means that, even in a narrow working site, the machine can be operated smoothly with the door in an open position. Thus, while suppressing sideward outrunning of the door, the above arrangements make it possible to secure a broader space within the cab to ensure an improved working environment.

Further, when the folding type door is opened, the two holder members on the door can be arrested in the catch members on the part of the cab box. Therefore, even if the cab door is kept open during a machine operation, rattling movements of folded door panel portions can be prevented respectively by two sets of holder members (or catch members). Suppression of rattling movements will result in prevention of deteriorations of hinges and suppression of noises.

Furthermore, when the folding type door is opened, it can be folded back along the left rear side section of the cab box. Therefore, even if the cab is formed in a large size, it is possible to locate an opened door within the width of the vehicle body or to suppress sideward outrunning of an opened door beyond the width of the vehicle body. Even if the door is kept open on a narrow working site, an operator can operate the machine smoothly without paying special attention to the door position.

(2) Further, according to the present invention, preferably the left rear side section of the cab box is formed in a convex arcuate shape from the left center pillar to the left rear pillar, and the folding type door is folded back along the left rear side section of the cab box when opened.

With the arrangements just described, upon opening, the folding type door is folded back in an arcuate shape along the left rear side section of the cab box, and held in a compact form along a side surface of the cab box. Therefore, it becomes possible to form the cab in a sufficiently large size while suppressing sideward outrunning of an opened door.

(3) Further, according to the present invention, preferably a stretchable protective cover is provided on the folding type door to cover a gap between two door panels of the folding type door.

In this case, a gap at folding portions of two door panels is covered with a protective cover which is stretchable following flexing movements of the two door panels of the folding type door. By this protective cover, operator's fingers are prevented from being pinched in the gap between the door panels when opening or closing the door, permitting an operator to handle the door in a facilitated manner.

(4) Further, according to the present invention, preferably the two holder members are separately attached on the door panels, and the two catch members are located at separate positions to be met by the two holder members when the folding type door is opened.

In this case, by two sets of holder and catch members, the two door panels are separately anchored in an open door position. As a consequence, by two sets of holder and catch members, rattling movements between the respective door panels relative to the cab box are effectively suppressed to hold the folding type door in an open door position in a stabilized state.

(5) Further, according to the present invention, preferably the left rear pillar of the cab is located at a position behind an operator's seat within the cab, clear of a rear view taken by an operator when he or she looks back from the operator's seat.

With the arrangements just described, the left rear pillar of the cab box is located in a position on the rear side of an operator's seat, within a range which would not obstruct a rear view taken by an operator when he or she looks back from the operator's seat. Consequently, an operator can take unobstructed rear views and operate the machine in an efficient manner.

BEST MODE FOR CARRYING OUT THE INVENTION

Figure 1:
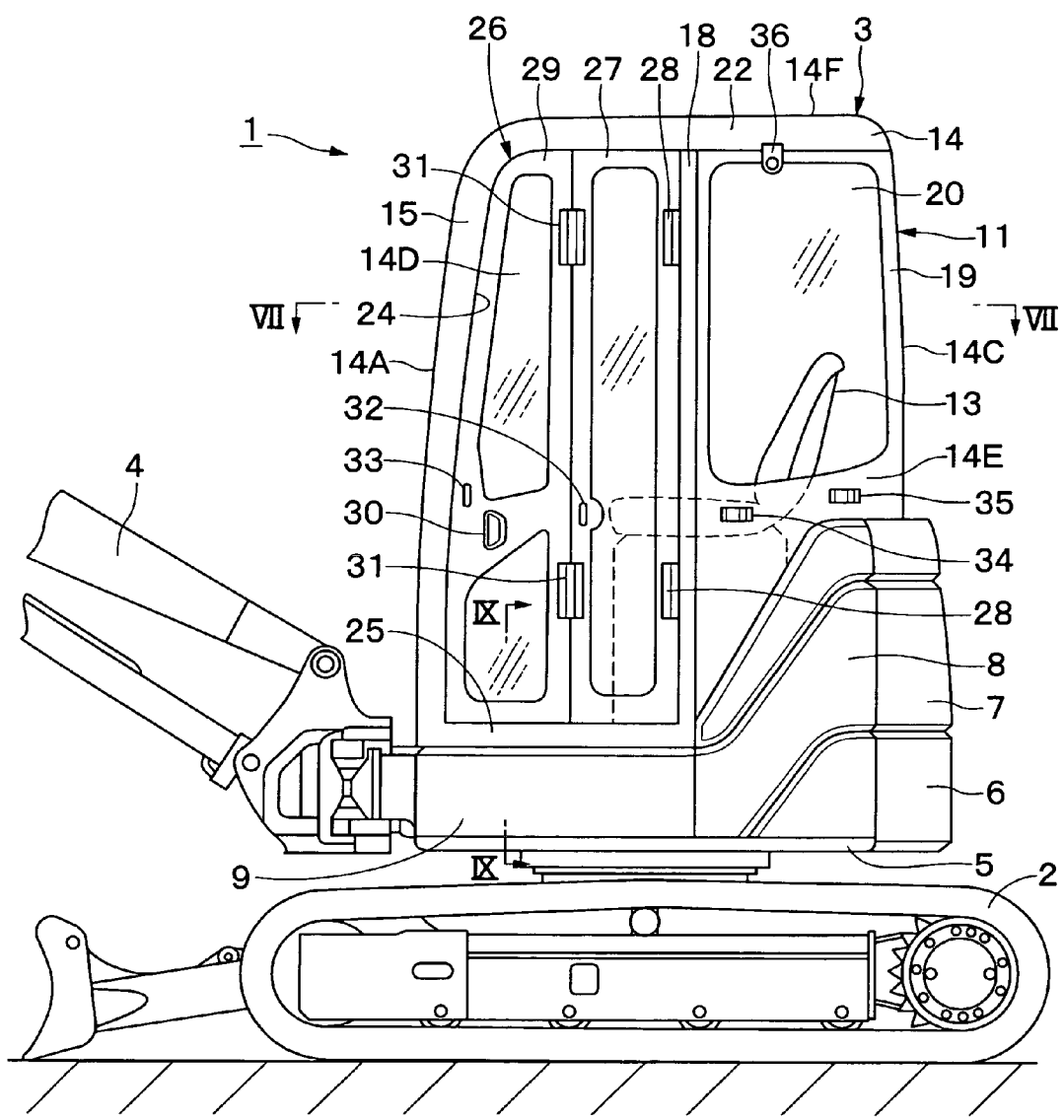
FIG. 1 is a left side view of a hydraulic excavator to which the present invention is applied.

Hereafter, with reference to FIGS. 1 through 13, the present invention is described more particularly by way of its preferred embodiments which are applied to a hydraulic excavator by way of example.

In the drawings, indicated at 1 is a hydraulic excavator, which is largely constituted by an automotive vehicular lower structure 2, an upper revolving structure 3 which is rotatably mounted on the vehicular lower structure 2, and a working mechanism 4 which is liftably mounted on the front side of the upper revolving structure and to be put in a ground excavating operation or the like. In this instance, the hydraulic excavator is constructed as a small turn type, more particularly, as a small back swing type having the upper revolving structure 3 formed substantially in a circular shape.

Figure 2:
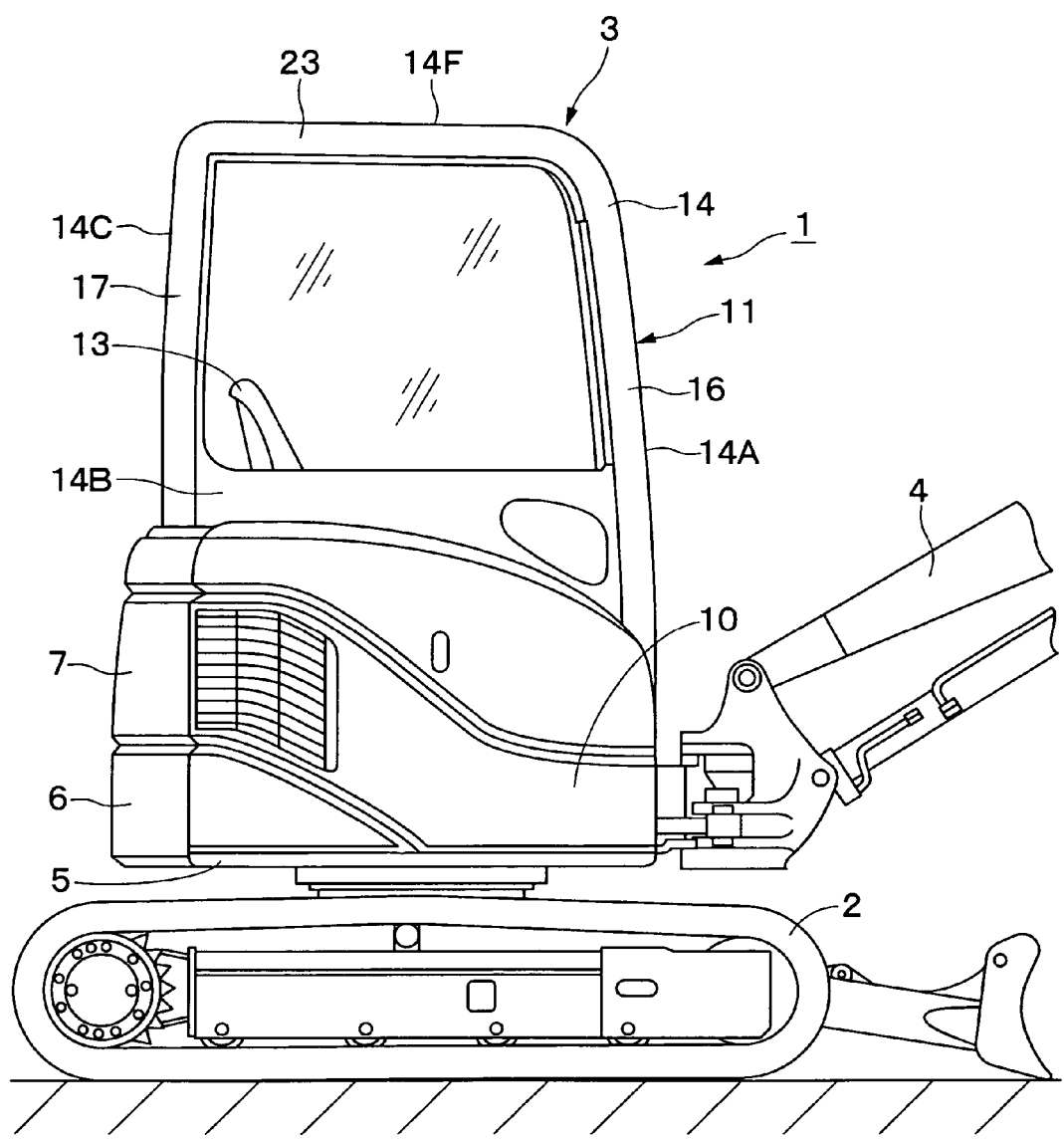
FIG. 2 is a right side view of the hydraulic excavator of FIG. 1.
Figure 3:
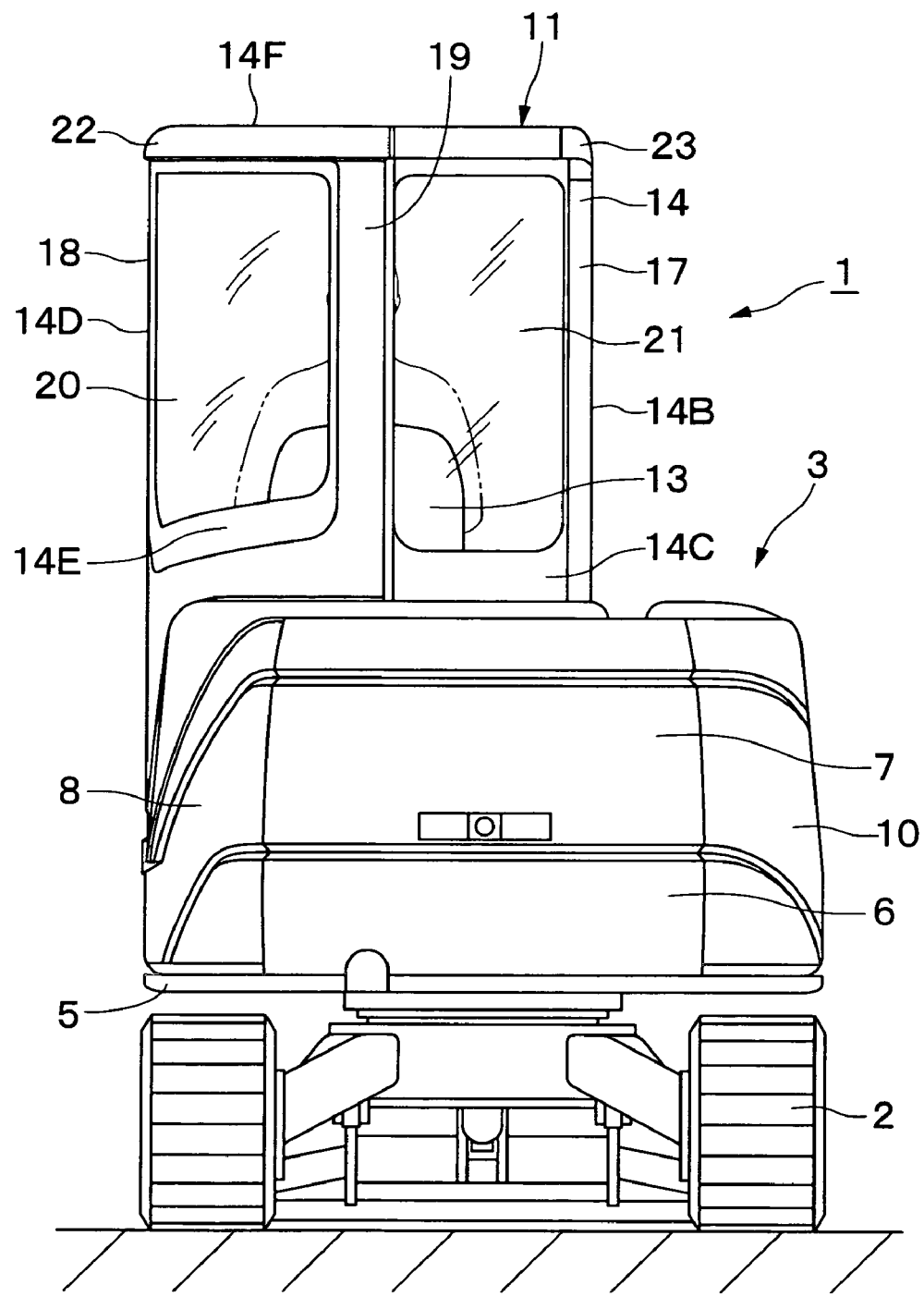
FIG. 3 is a back side view of the hydraulic excavator of FIG. 1.
Figure 4:
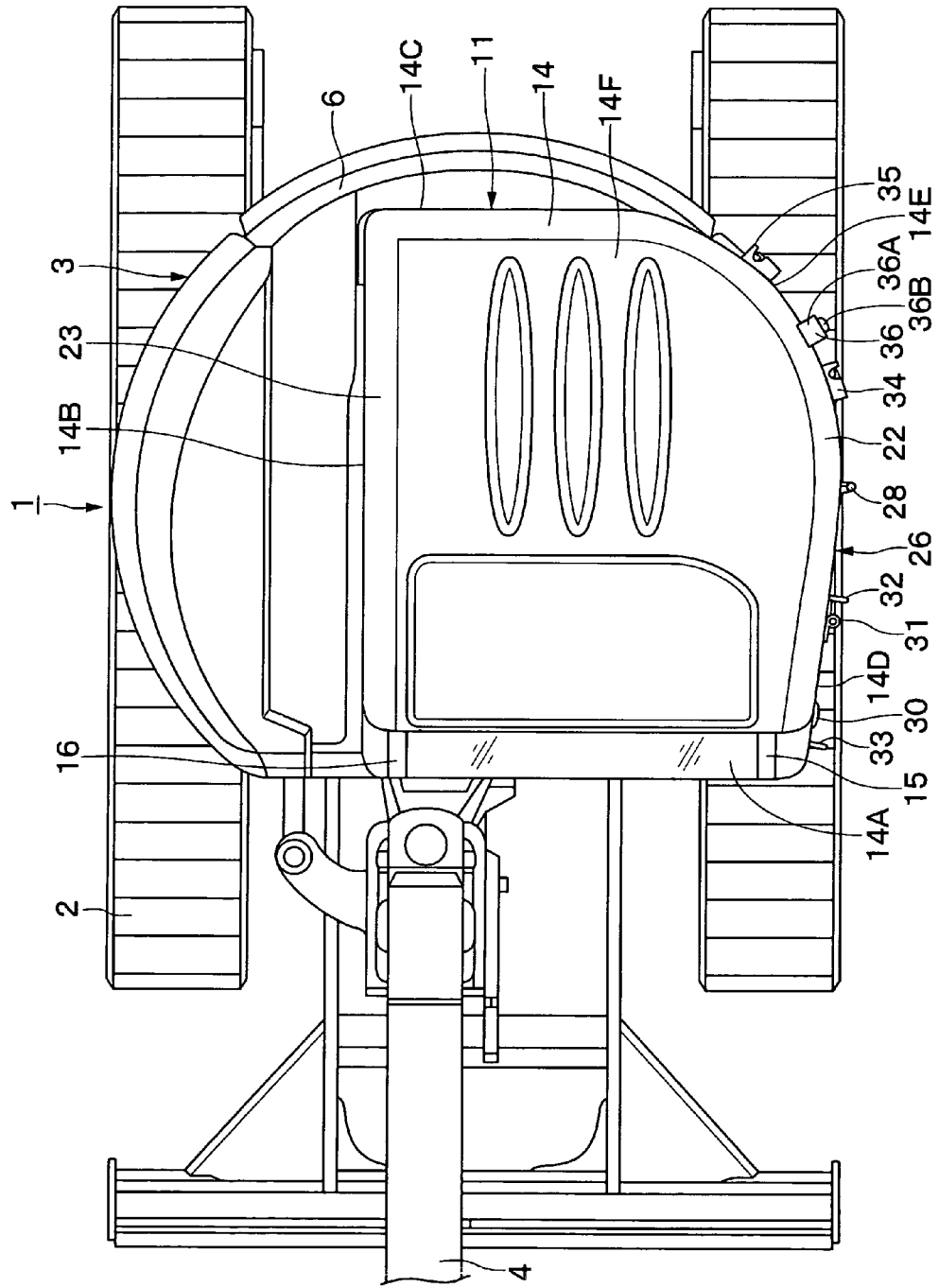
FIG. 4 is a plan view of the hydraulic excavator of FIG. 1.

Further, as shown in FIGS. 1 to 5, the upper revolving structure 3 includes a revolving frame 5 which is formed as a support structure by a combination of bottom and vertical plates (not shown), a cab 11 which is mounted on a front side of the revolving frame 5, a counterweight 6 which is attached to a rear end of the revolving frame 5, an engine cover 7 covering from rear side an engine, hydraulic pump and heat exchanger (not shown) which are mounted on a rear side portion of the cab 11, a left engine cover 8 covering the engine and other equipments from left side, a left side cover 9 (a left skirt cover) covering a front side portion of the revolving frame 5 from left side, and a right side cover 10 (a right skirt cover) covering the engine and the revolving frame 5 from right side. Further, as shown in FIG. 4, the upper revolving structure 3 is formed substantially in a circular shape when viewed from upper side, so that it can make turns within the width of the vehicular lower structure 2.

In this instance, as shown in FIG. 1, the left engine cover 8 is extended obliquely downward toward the lower side of the cab 11 from the left side of the engine cover 7 to cover, for example, the left side of the engine and hydraulic pump. In continuation from the fore end of the left engine cover 8, the left side cover 9 is extended forward along the left lower side of the cab 11 in such a way as to cover the revolving frame 5 from left side. This left side cover 9 is formed substantially in a flat shape in the vertical direction.

On the other hand, as shown in FIG. 2, the rear portion of the right side cover 10 is extended in a downwardly inclined direction from the right side of the engine cover 7 as far as an upper end of the revolving frame 5 and the front portion of the right side cover is extended forward in such a way as to cover the revolving frame 5 from right side. Further, for example, the right side cover 10 is formed in a convexly arcuate shape in conformity with a turn radius of the upper revolving structure 3.

The above-mentioned engine cover 7, left engine cover 8, left side cover 9 and right side cover 10 constitute exterior covers of the upper revolving structure 3 which cover the ambience of the equipments such as engine, tank and the revolving frame 5.

Indicated at 11 is the cab of the hydraulic excavator, which is mounted on a left side of the revolving frame 5. The cab 11 is mounted on the revolving frame 5 through a vibration proof mounter (not shown), and, as shown in FIGS. 1 through 5, constituted by a floor panel 12 which is laid on the revolving frame 5, an operator's seat 13 which is provided on the floor panel 12 and seated by an operator and a cab box 14 which will be described hereinafter. The operator's seat 13 is located in a rear center position within the cab box 14.

Figure 6:
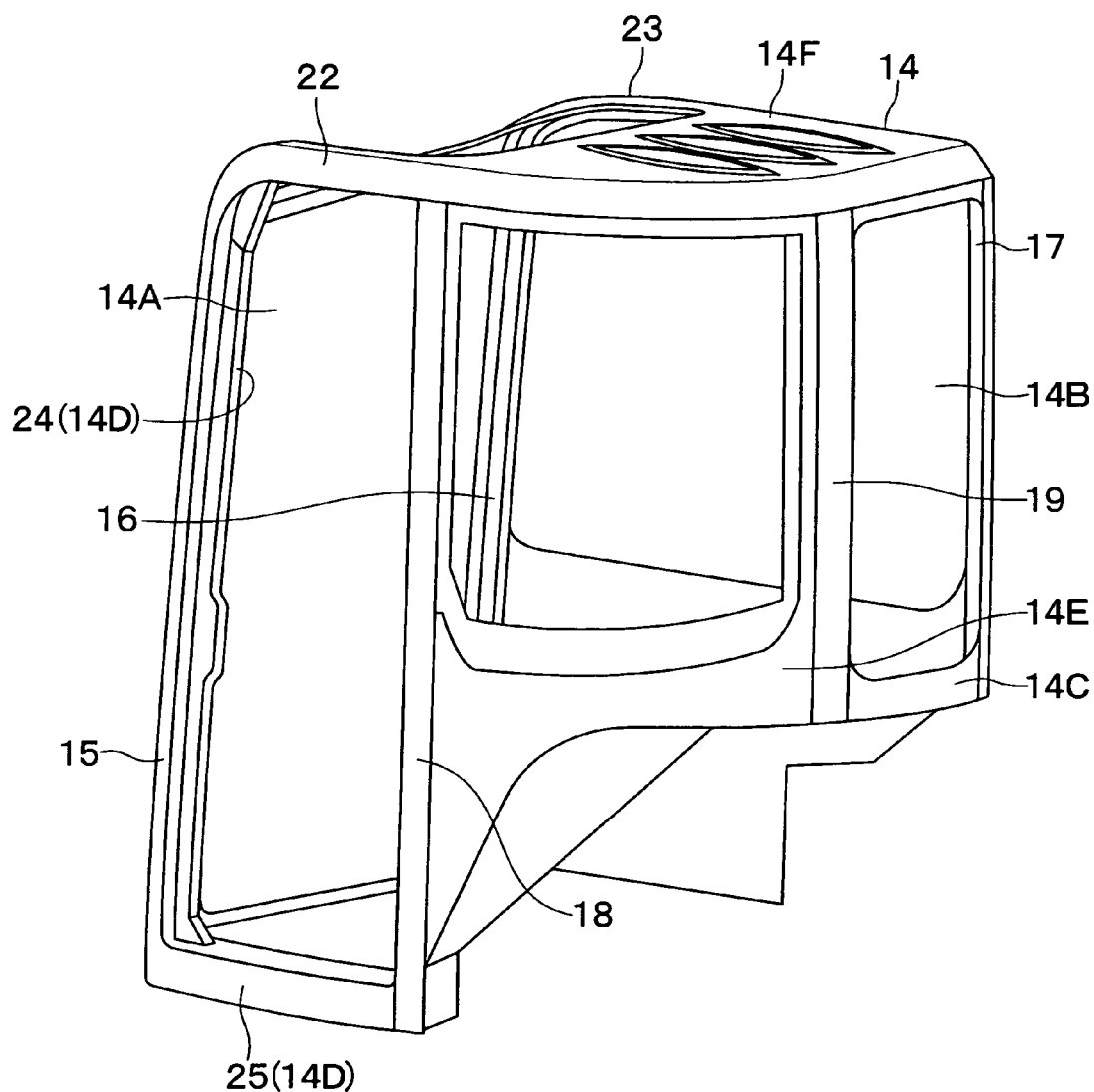
FIG. 6 is a perspective view of a cab box alone.
Figure 7:
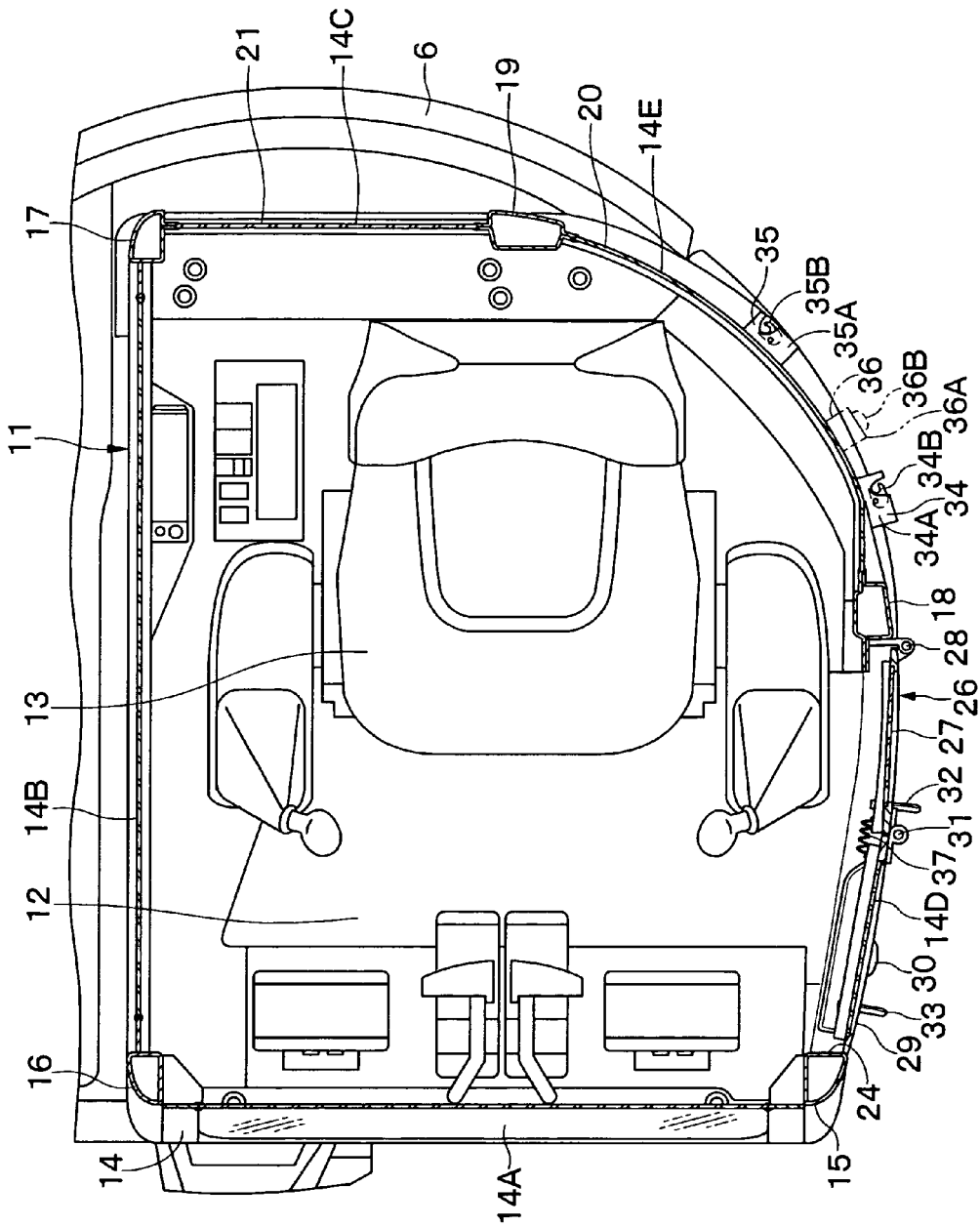
FIG. 7 is an enlarged cross-section view of the cab, taken in the direction of arrows VII-VII of FIG. 1.

Indicated at 14 is the cab box which defines the outer configuration of the cab 11, and built on the revolving frame 5 in such a way as to circumvent the operator's seat 13. As shown in FIGS. 6 and 7, the cab box 14 is formed of five vertically extending pillars, including left front pillar 15, right front pillar 16, right rear pillar 17, center pillar 18 and left rear pillar 19 which will be described hereinafter, and five side sections which are defined between the respective pillars 15 to 19, including front side section 14A, right side section 14B, rear side section 14C, left front side section 14D, and left rear side section 14E.

In this instance, the left rear side section 14E of the cab box 14 is formed in an outwardly convex arcuate shape, as an arcuate shape, from the center pillar 18 to the left rear pillar 19, together with a left rear window pane 20 which forms a part of the left rear side section as will be described hereinafter. Accordingly, the left rear side section 14E contributes to secure a broader dwelling space within the cab box 14 and within the radius of turn of the upper revolving structure 3. Further, the left rear side section 14E has a door support surface to which a folding type door 26 is attached when the door 26 is opened as described hereinafter.

Hereafter, the pillars 15 to 19 are described more particularly, the left front pillar 15 is located at a left front position of the cab box 14 to form a ridge line between the front side section 14A and the left front side section 14D, while the right front pillar 16 is located at a right front position of the cab box 14 to form a ridge line between the front side section 14A and the right side section 14B. The right rear pillar 17 is located at a right rear position of the cab box 14 to form a ridge line between the right side section 14B and the rear side section 14C.

Further, the center pillar 18 constitutes a left intermediate pillar provided at an intermediate position between front and rear directions on the left side of the cab box 14, and is located at the boundaries of the left front side section 14D and the left rear side section 14E in the proximity to the left side of the operator's seat 13. A folding type door 26 is pivotally attached to the center pillar 18 to open and close an entrance way 24 for horizontal swing movement, which will be described hereinafter.

Further, as shown in FIGS. 3 and 7, the left rear pillar 19 is located at a rear side of the cab box 14 and spaced from the left side of the right rear pillar 17 by a distance which is approximately half of the width of the cab box 14. In this instance, the left rear pillar 19 is located at a position rearward of the operator's seat 13, free of possibilities of obstructing rear view field of an operator who is seated on the operator's seat 13.

More specifically, the left rear pillar 19 is located in the proximity to the rear side of the operator's seat 13 at such a position which would not obstruct the view field of an operator when he or she looks back toward the rear side of the machine. More preferably, the left rear pillar is located behind and between right and left sides of the operator's seat 13. The left rear pillar 19, if so located, can effectively prevent deformation of the cab box 14 around the operator (on the operator's seat 13) when the hydraulic excavator 1 is caused to fall down or collided against a heavy object.

Further, in case the left rear pillar 19 is located rearward of the operator's seat 13, an operator who is seated on the operator's seat 13 can take a view of a wide range through a left rear window pane 20 between the center pillar 18 and the left rear pillar 19 as soon as looking back in a left-rearward direction. On the other hand, if an operator looks back in a right-rearward direction, he or she can take a view of a wide range through a rear window pane 21 between the right rear pillar 17 and the left rear pillar 19. Thus, an operator who is seated on the operator's seat 13 is allowed to take a wide view in rearward directions.

For example, the left rear pillar 19 is formed by joining together inner and outer panel members by welding means into a pillar of a tubular shape in cross section which is constituted as a strength member augmented in strength. That is to say, the left rear pillar 19 contributes to strengthen all the more a rear center portion of the cab box 14, which is very important from the standpoint of protection of an operator.

On the other hand, indicated at 22 is a left roof pillar which is provided at a left upper side of the cab box 14, forming a ridge line dividing the left front side section 14D and the left rear side section 14E from a roof section 14F of the cab box 14. A rear portion of the left roof pillar 22 between the pillars 18 and 19 is formed in an outwardly convex arcuate shape. Further, indicated at 23 is a right roof pillar which is provided at an upper right side of the cab box 14, forming a ridge line between the right side section 14B and the roof section 14F of the cab box 14.

Indicated at 24 is an entrance way which is provided between the left front pillar 15 and the center pillar 18 of the cab box 14. This entrance way 24 is used by an operator at the time of getting onto or getting down from the cab 11, and opened or closed by a folding type door 26. In this instance, the entrance way 24 (or the folding type door 26) constitutes the left front side section 14D of the cab box 14, along with a lower tie plate 25 which is provided between lower sides of the pillars 15 and 18.

Denoted at 26 is the folding type door which is pivotally attached to the center pillar 18 of the cab box 14. This folding type door 26 is openably or closeably fitted in (the entrance way 24) between the left front pillar 15 and the center pillar 18. Further, the folding type door 26 is constituted by a couple of door panels 27 and 29, hinges 28 and 31, strikers 32 and 33 and a protective cover 37, which will be described hereinafter, and the two door panels are foldably (flexibly) connected to each other through intermediary hinges 31 and foldable toward each other.

Figure 5:
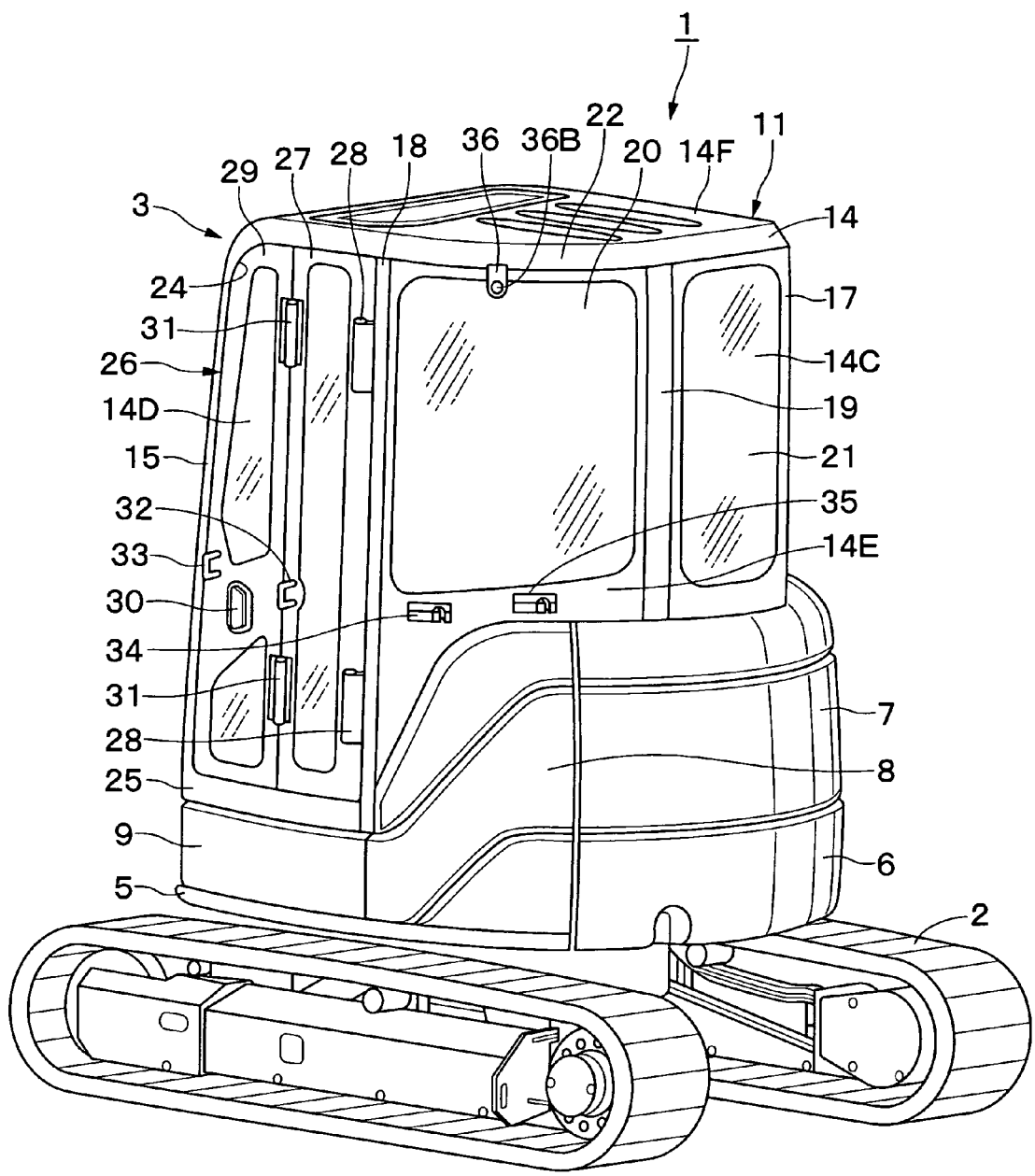
FIG. 5 is a perspective view of the hydraulic excavator of FIG. 1, taken obliquely from rear side.
Figure 10:
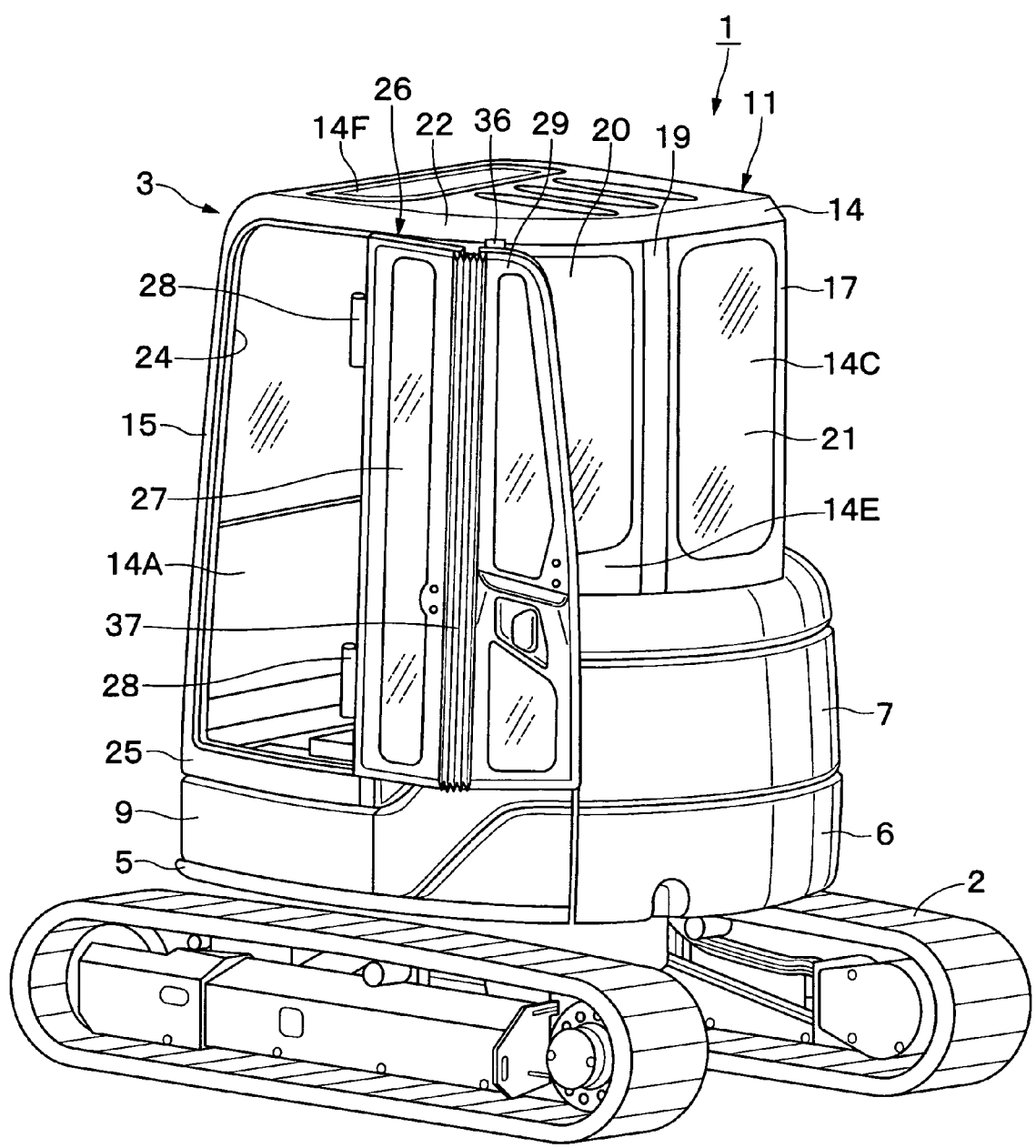
FIG. 10 is a perspective view of the cab door in an open position, taken from the same direction as FIG. 5.
Figure 11:
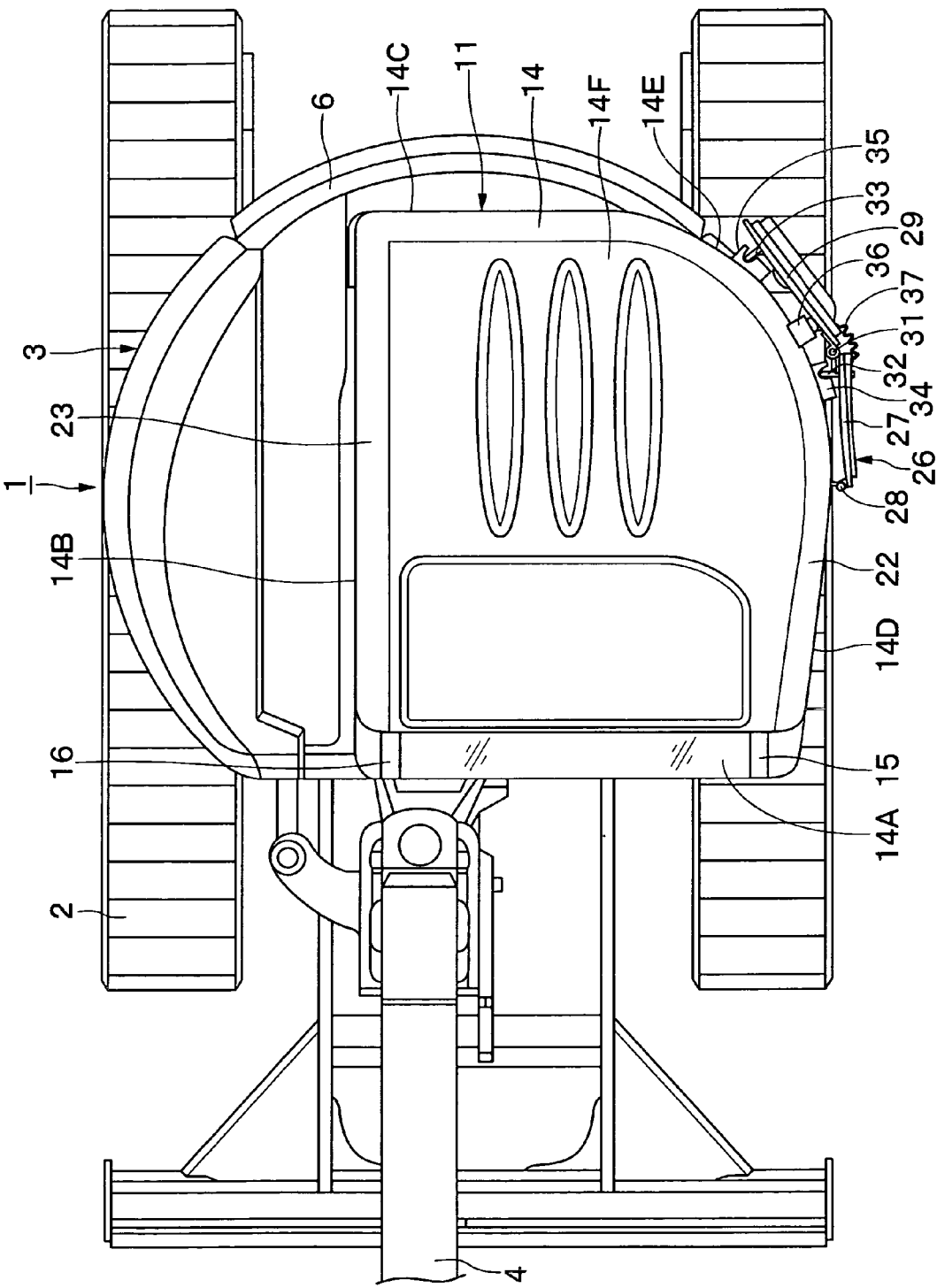
FIG. 11 is a plan view of a vehicular body of the hydraulic excavator, with the door in an opened state.
Figure 12:
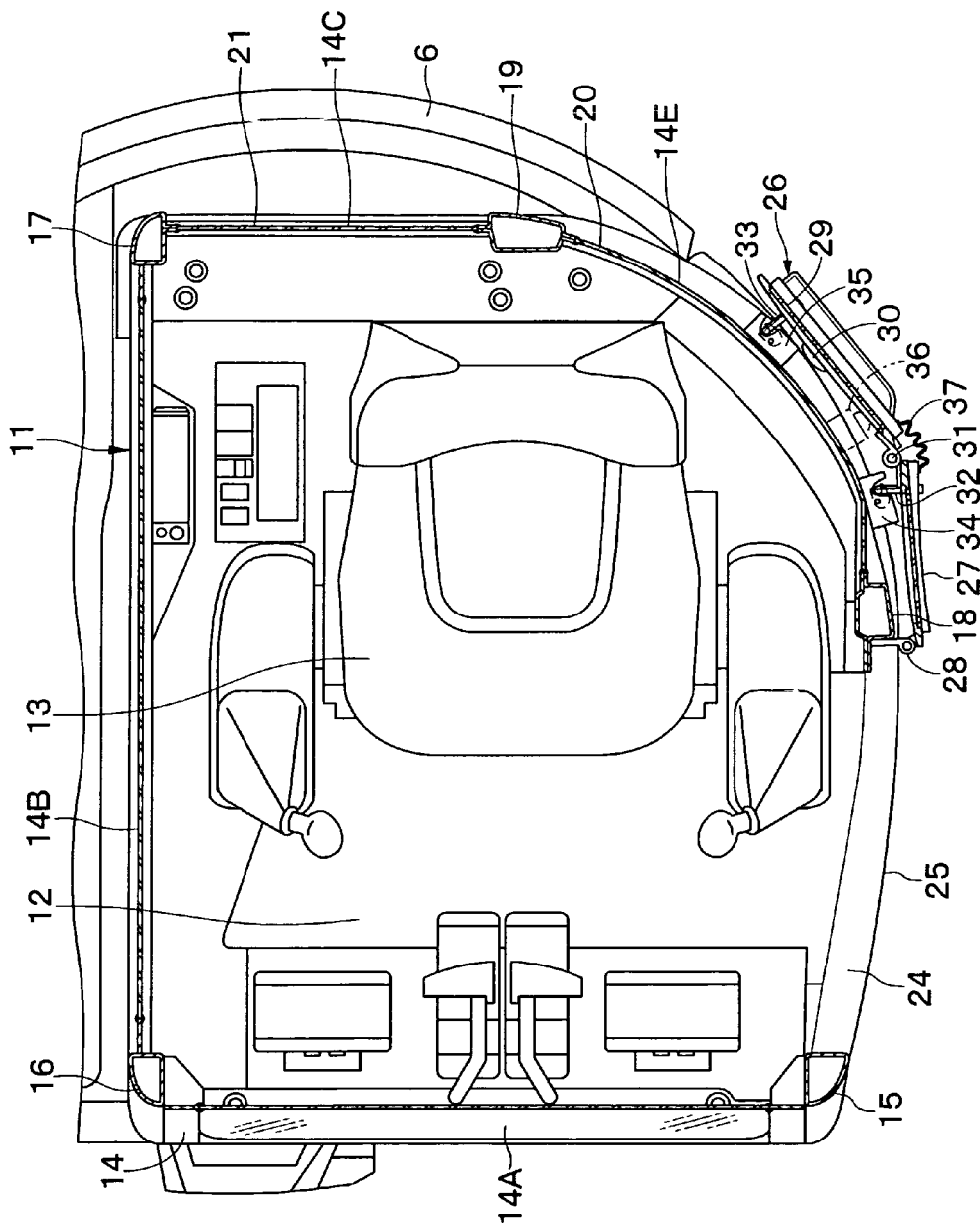
FIG. 12 is a cross-sectional view of the cab door in an opened state, taken from the same direction as FIG. 7.

The folding type door 26 can be turned forward and backward about the center pillar 18 (or about the door hinges 28) to take a closed door position closing the entrance way 24 of the cab box 14 as shown in FIGS. 5 and 7, or to take an open door position in which the door is folded back in an arcuate shape (substantially in L-shape) along the left rear side section 14E of the cab box 14 when the door is opened as shown in FIGS. 10 and 12.

Indicated at 27 is a first door panel which is formed, for example, in a vertically elongated rectangular shape, and its rear long side (base end) is pivotally supported on the center pillar 18 of the cab box 14, for example, by the use of a couple of door hinges 28. In this instance, the two door hinges 28 are provided at two vertically spaced positions, pivotally connecting the first door panel 27 to the center pillar 18 for horizontal swinging movements.

Indicated at 29 is a second door panel which is foldably connected to the first door panel 27. This second door panel 29 is connected to a fore long side (fore end) of the first door panel 27 by the use of upper and lower intermediary hinges 31 for forward and backward flexing movements relative to the first door panel 27. Further, the second door panel 29 is provided with a door grip 30 to be pulled by an operator, along with a latch mechanism (not shown) which is engageable with a corresponding part on the left front pillar 15 to keep the folding type door 26 in a closed position and disengaged from the left front pillar as soon as the door grip 30 is pulled.

Designated at 31 are intermediary hinges, for example, a couple of intermediary hinges which are provided between the two door panels 27 and 29. These intermediary hinges 31 are attached in vertically spaced positions to connect the two door panels 27 and 29 flexibly relative to each other.

Figure 8:
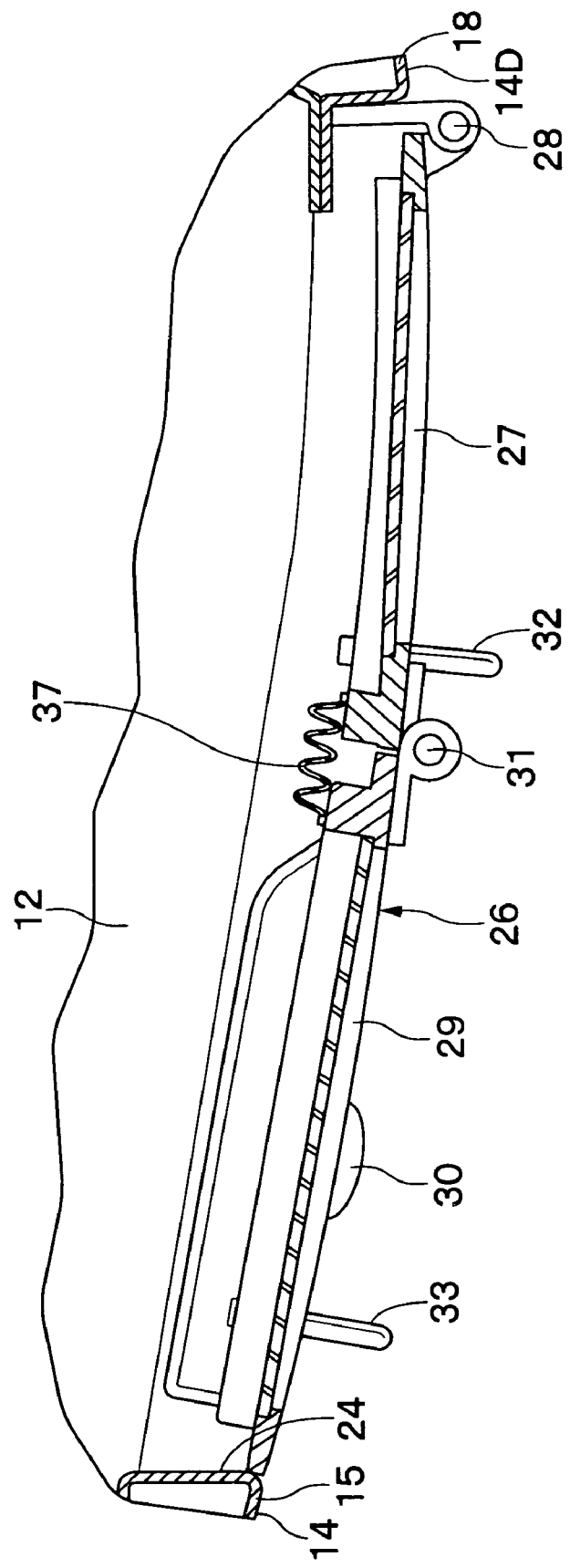
FIG. 8 is an enlarged fragmentary sectional view of a folding type door in a closed position of FIG. 7.
Figure 9:
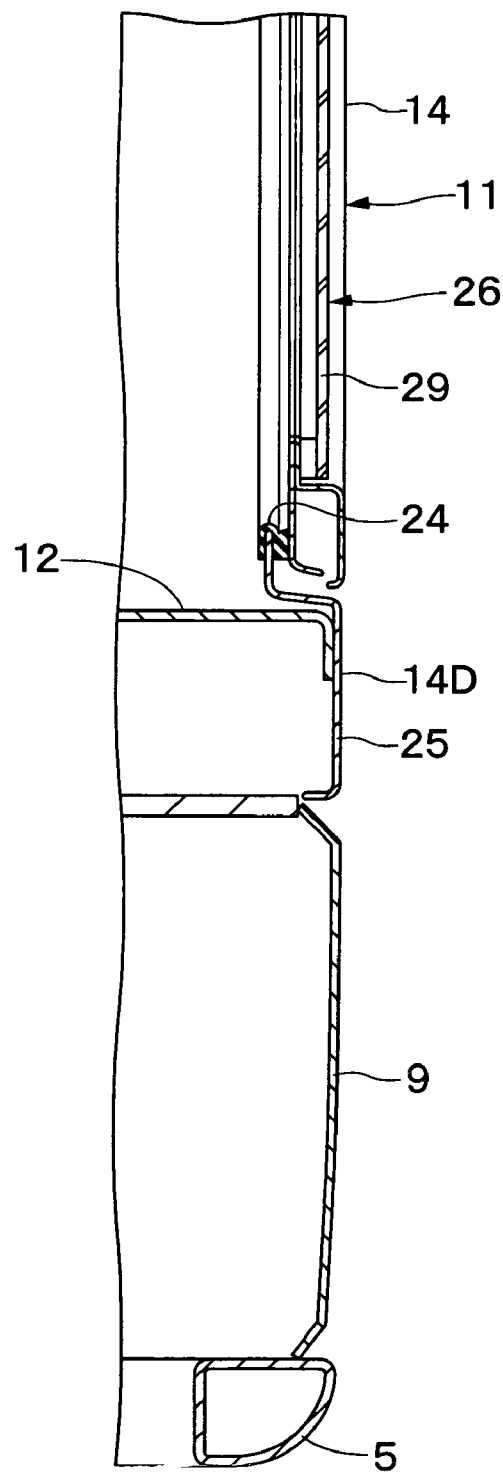
FIG. 9 is an enlarged fragmentary sectional view of the folding type door closed flush with a left side cover of the cab, taken in the direction of arrows IX-IX of FIG. 1.

As shown in FIGS. 7 and 8, when the folding type door 26 is in a closed position, the entrance way 24 of the cab box 14 is closed by the two door panels 27 and 29 which are substantially in a flat form. In this state, as shown in FIG. 9, the two door panels 27 and 29 of the folding type door 26, the lower tie plate 25 of the cab box 14 and the left side cover 9 of the upper revolving structure 3 are extended for vertical directions and located substantially in the same vertical plane. That is to say, the folding type door 26 is continuously disposed flush with the left side cover 9, without forming a stepped surface therebetween.

Therefore, the left front side section 14D of the cab box 14 can be located at a leftmost position within the vehicle width. Besides, even if the folding type door 26 is left in a closed state at a snowing site, there is no possibility of the folding type door being stuck in the closed position due to snow which lies on the outer side of the door panels 27 and 29.

Further, as shown in FIG. 12, when the folding type door 26 is opened, the two door panels 27 and 29 are bent substantially into L-shape, flexing about the intermediary hinges 31, and folded back substantially in an arcuate form along the left rear side section 14E of the cab box 14. The door panels 27 and 29 are retained in an open state by strikers 32 and 33 and catches 34 and 35 which will be described hereinafter. Thus, even in a case where the cab 11 is built in a large size, it is possible to suppress the degree of outrunning of the door in the open position, i.e., to minimize a distance of sideward outrunning of the door beyond the width of the vehicle body.

Denoted at 32 is a striker which is projected on the outer side of the first door panel 27 at a position between the two intermediary hinges 31 to serve as a holder members. This striker 32 is located at a position forward of and spaced from the door hinges 28 at the pivoting point of swinging movements of the door panel 27. The striker 32 is formed, for example, as a metal piece of substantially U-shape as shown in FIG. 6. When the folding type door 26 is opened, the striker 32 is attachably or detachably engaged with a catch 34 which is provided in the left rear side section 14E of the cab box 14, which will be described hereinafter, holding the first door panel 27 in an open position by engagement with the catch 34.

Further, indicated at 33 is another striker which is projected on the second door panel 29 at a position forward of the door grip 30 to serve as a holder members. This striker 33 is located at a position forward of and spaced from the intermediary hinges 31 at the pivoting point of swinging movements of the second door panel 29. Similarly to the striker 32, the striker 33 attachably or detachably engaged with another catch 35, holding the second door panel 29 in an open position in cooperation with the catch 35.

Indicated at 34 and 35 are a couple of catches which are provided in the left rear side section 14E of the cab box 14 to serve as catch members. These catches 34 and 35 are located in spaced fore and rear positions on the left rear side section 14E to be met by the strikers 32 and 33, respectively.

Figure 13:
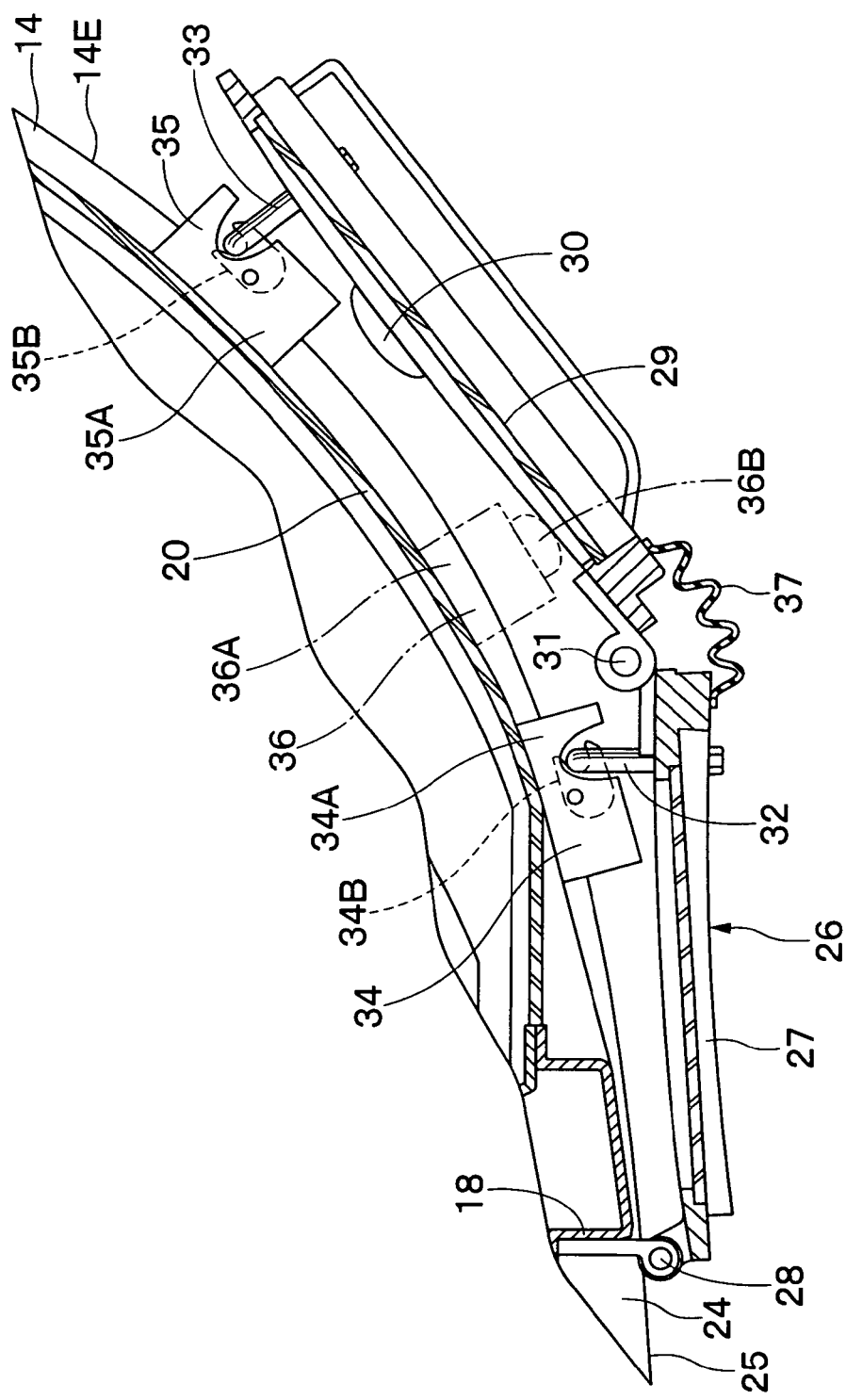
FIG. 13 is an enlarged fragmentary sectional view of the folding type door in an opened state of FIG. 12.

In this instance, the catch 34 is located in a front side of the left rear side section 14E of the cab box 14, at a corresponding position relative to the striker 32 on the first door panel 27. Further, as shown in FIG. 13, the catch 34 is composed of a fixed portion 34A which is securely fixed to the cab box 14, a claw portion 34B of substantially U-shape which is movably or displaceably supported on the fixed portion 34A and brought into and out of engagement with the striker 32, and a retainer spring (not shown) which adapted to hold the claw portion 34B at a predetermined position when in engagement with the striker 32.

When the first door panel 27 is opened up to the open door position, the claw portion 34B is pushed toward the fixed portion 34A by the striker 32 on the part of the door panel 27, and as a result of displacement of the claw portion 34B the striker 32 is arrested within the claw portion 34B. Accordingly, the striker and the catch are retained in the engaged state by the action of the retainer spring to lock the door panel 27 in the open door position.

In order to close the first door panel 27 in the open door position, the claw portion 34B is disengaged from the striker 32 against the action of the retainer spring upon pulling the door panel in a direction away from the catch 34 by applying a force of a certain magnitude which overcomes the action of the retainer spring. As a result, the striker 32 is disengaged from the catch, and the door panel 27 is freed from the locked state.

On the other hand, the other catch 35 is located in a rear side of the left rear side section 14E of the cab box 14, at a meeting position relative to the striker 33 on the second door panel 29. Further, similarly to the catch 34, the catch 35 is composed of a fixed portion 35A, a claw portion 35B and a retainer spring, and adapted to catch and release the striker 33 by a one-touch action.

In this instance, the strikers 32 and 33 and the catches 34 and 35 are provided for locking two door panels 27 and 29 separately. Namely, the first door panel 27 is locked by the striker 32 and the catch 34, and the second door panel 29 is locked by the striker 33 and the catch 35. Accordingly, the strikers 32 and 33 and the catches 34 and 35 can prevent rattling movements of the two door panels 27 and 29 separately, retaining the folding type door 26 in an open door position in a stabilized state in cooperation with a door cushion 36 which will be described hereinafter.

Indicated at 36 is the door cushion which is provided either in the left rear side section 14E or in the roof section 14F of the cab box 14. This door cushion 36 is composed of a bracket 36A which is attached to the cab box 14, and a resilient member 36B which is formed of a resilient material such as rubber or the like, and attached to the bracket 36A.

When the folding type door 26 is in an open door position, the resilient member 36B is resiliently abutted against the door panel 29. Accordingly, the door cushion 36 serves to resiliently support the whole door and to damp rattling or vibrating movements of the folding type door 26 for protection thereof in cooperation with the strikers 32 and 33 and the catches 34 and 35.

Indicated at 37 is a protective cover which is provided between the two door panels 27 and 29 of the folding type door 26 for the purpose of protecting operator's fingers. This protective cover 37 is formed of, for example, a resilient or flexible material such as sheet, cloth or film in the form of bellows.

Further, the protective cover 37 is arranged to cover a gap between the two parts of the folding type door 26 (door panels 27 and 29) entirely from top to bottom with stretchability in a direction crosswise of the door. Thus, as the two door panels 27 and 29 flexed about the intermediary hinges 31 at the time of opening or closing the folding type door 26, the protective cover 37 prevents operator's fingers from being pinched between the two door panels 27 and 29.

With the above-described arrangements, the hydraulic excavator 1 according to the present embodiment is put in operation in the manner as described below.

In the first place, an operator takes the operator's seat 13 within the cab 11. When the folding type door 26 is closed, the folding type door 26 and the left side cover 9 constituted as the exterior cover of the upper revolving structure 3 are located substantially in the same vertical plane as shown in FIG. 9. As a consequence, the left front side section 14D of the cab box 14 is located substantially flush with the left side of the revolving frame 5. That is to say, the size of the cab box 14 can be increased to the maximum within the width of the vehicle body to secure improved environment for the operator.

By the operator who is seated on the operator's seat 13 within the cab 11, the control levers are operated to put the machine in travel or to swing the upper revolving structure 3 to and fro while operating the working mechanism 4 for a ground excavating operation or for other jobs.

In this connection, the hydraulic excavator 1 has possibilities of fall down on the ground while traveling or working on a steep slope in an inappropriate posture. Should the machine fall down, extremely large loads are imposed on the cab 11. However, in the case of the cab 11 of the present embodiment, even if in case where extremely large loads are imposed on the cab 11, the left rear pillar 19 of the cab box 14 which is located behind the operator's seat 13 can prevent large detrimental deformations of the cab box 14 around the operator's seat 13 to protect the operator from falling loads.

Further, the location of the left rear pillar 19 at a position behind the operator's seat 13 does not come into the view field of an operator when an operator who is seated on the operator's seat 13 looks back in an obliquely rearward direction, guaranteeing a wide rear view filed for the operator to operate the machine in an efficient manner.

Further, when it is desired to keep the door 26 open during a machine operation, what is required for an operator is to open the door 26 and, after turning the door rearward as far as the open door position along the left rear side section 14E of the cab 11, push the strikers 32 and 33 on the side of the door against the catches 34 and 35. By so doing, the operator can get the strikers 32 and 33 stopped in the catches 34 and 35 by a one-touch action. Thus, the folding type door 26 can be locked in the open door position easily by simple actions of the operator.

In this state, the folding type door 26 can be folded in a compact form along the arcuate left rear side section 14E and left engine cover 8, so that the operator can drive or swing the machine smoothly without paying special attention to the position or an outrunning of the door 26 in an opened state.

On such an occasion, external forces such as vibrations and impacts resulting from a machine operation can be transmitted to the opened door 26 while driving the machine. However, the first door panel 27 of the folding type door 26 is retained in the open door position by the striker 32 and the catch 34, and the other door panel 29 is retained in the open door position by the striker 33 and the catch 35. In addition, the folding type door 26 is resiliently supported by the door cushion 36. Therefore, when the folding type door 26 is opened, the two door panels 27 and 29 are separately and independently retained in the respective open door positions, free of rattling movements of the door panels 27 and 29 which would invite deteriorations of the hinges 28 and 31 and make noisy sounds.

Further, at the time of closing the folding type door 26, the respective strikers 32 and 33 can be easily pulled out of the catches 34 and 35 simply by pulling the door panels 27 and 29 in a direction away from the cab box 14, and the door can be closed smoothly.

Thus, according to the present embodiment, the folding type door 26 is composed of a couple of door panels 27 and 29, and the strikers 32 and 33 are provided on the two door panels 27 and 29, respectively, for engagement with the catches 34 and 35 which are provided at corresponding positions in the left rear side section 14E of the cab box 14.

Accordingly, when opened, the folding type door 26 can be folded back along the left rear side section 14E of the cab box 14. Therefore, even in a case where the cab 11 is formed in a large size, it is possible to locate the opened door 26 within the width of the vehicle or to suppress the degree of 5 sideward outrunning of the opened door 26 beyond the width of the vehicular lower structure 2.

Especially, in the case of the present embodiment, the left rear side section 14E of the cab box 14 is contoured in a convexly arcuate shape, so that the opened door can be folded back substantially in an arcuate shape along the left rear side section 14E, and located and accommodated in the open door position in a compact form.

In the open door position, the two door panels 27 and 29 can be locked in the open position by means of two sets of strikers 32 and 33 and catches 34 and 35 in a stabilized state, preventing the door panels 27 and 29 from being dislodged from the respective open door positions by suppression of rattling movements, preventing deteriorations of the hinges 28 and 31 and generation of rattling noises in a secure manner to enhance the durability of the cab door.

Therefore, after opening the folding type door 26, the operator can drive the machine or perform various operations by the machine smoothly without paying much attention to the position of the door 26 or without being annoyed by rattling noises, and can carry out a work efficiently even in a narrow working site.

Further, the first door panel 27 is locked by the striker 32 and the catch 34 while the second door panel 29 is locked by the striker 33 and the catch 35. Therefore, rattling movements of the first door panel 27 relative to the cab box 14 and rattling movements of the second door panel 29 relative to the first door panel 27 are separately and independently prevented by the two sets of strikers and catches 32 to 35, retaining the folding type door 26 in the open door position all the more in a stabilized state.

Further, the use of the folding type door 26 makes it possible to suppress outrunning of a door and to locate the left front side section 14D and the left rear side section 14E of the cab box 14 at a leftmost position within the vehicle width. This means that a broader space can be secured within the cab 11 to guarantee an improved operating environment for the operator.

On the other hand, when the folding type door 26 is closed, the two door panels 27 and 29 of the door 26 are disposed substantially in the same vertical plane as the lower tie plate 25 of the cab box 14 and the left side cover 9 of the upper revolving structure 3, and connected with the latter in such a way as to form a virtually flat continuous surface without stepped surfaces.

That is to say, the left front side section 14D of the cab box 14 can be located at a leftmost position within the width of the vehicle for the purpose of securing a broader inner space for the cab 11 within the width of the vehicle. Accordingly, the operating environment can be improved for the operator without hampering vehicle driving operations or swing motions of the machine.

Further, since the folding type door 26 and the left side cover 9 of the upper revolving structure 3 are disposed in the same vertical plane, there is no stepped surface under the door 26. Therefore, even if the folding type door 26 is kept closed on a snowing day, for example, the door can be opened and closed smoothly without being hampered by snow which lies on the outer side of the door panels 27 and 29.

Further, the gap space between the two door panels 27 and 29 is covered with the protective cover 37 which is stretchable and can follow flexing movements of the door. Therefore, when the folding type door 26 is opened and closed by an operator, it can be handled easily in a safe manner because operator's fingers are protected by the protective cover 37, which prevents operator's fingers from being pinched between the two door panels 27 and 29.

Further, the left rear side section 14E of the cab box 14 is formed in an arcuately curved shape between the center pillar 18 and the left rear pillar 19. Therefore, as mentioned hereinbefore, even in a case where the cab 11 is built on a circular or round upper revolving structure 3 of a small-size hydraulic excavator which is generally called "a small back swing type," the left rear side section 14E can be retained in the radius of turn of the upper revolving structure, making it possible to minimize the radius of turn to enhance working efficiency. Besides, the left rear side section 14E of the cab box 14 which is formed in an arcuate shape is enhanced in rigidity as compared with a flat structure, and contributes to enhance the strength of the cab box 14 around the operator's seat 13 all the more.

Furthermore, the left rear pillar 19 of the cab box 14 is located on the rear side of the operator's seat 13, so that it contributes to enhance efficiently the strength of a cab box 14 in the vicinity of the operator's seat 13 on which an operator is seated by the left rear pillar 19. Therefore, in case the hydraulic excavator falls down and the cab box 14 is subjected to large loads, deformation of the cab box 14 can be suppressed to a minimum by the left rear pillar.

Besides, the left rear pillar 19 is located behind the operator's seat 13 within a range which will not obstruct the view field in rearward directions for an operator who is seated on an operator's seat 13. That is to say, the left rear pillar 19 is outside an operator's view field when he or she looks back to take a rear view, broadening the rear view field angle to ensure enhanced working efficiency.

Further, in cooperation with the left rear pillar 19, the center pillar 18 which is located adjacently on the left side of the operator's seat 13 effectively enhances the strength of the cab box 14 at and around the operator's seat 13 on which an operator is seated.

According to the present embodiment of the invention, the strikers 32 and 33 on the folding type door 26 are each provided as a substantially U-shaped metal piece, while the catches 34 and 35 on the part of the cab box 14 are each provided with a substantially U-shaped claw portion 34B adapted to arrest the striker 32 or 33. However, in this regard, the present invention is not limited to the particular example shown. For instance, as in Japanese Patent Laid-Open No. H1-198929 mentioned hereinbefore, there may be employed a striker which is constituted by a rod-like member with a large diameter portion at a distal end, in combination with a catch with claw portions adapted to hold the large diameter portion of the striker. In this case, when the door is opened, the large diameter portion of the striker is arrested by the claw portions of the catches from radially outside to stop the door in an open door position.

Further, in the case of the particular embodiment shown, the present invention is described in connection with a small-size hydraulic excavator as an example of construction machine. However, needless to say, the present invention can be similarly applied to medium- and large-size hydraulic excavators, wheel type hydraulic excavators, hydraulic cranes and the like.

The invention claimed is:

1. A construction machine comprised of an automotive vehicular lower structure, and an upper revolving structure rotatably mounted on said vehicular lower structure and having a cab built on a frame and covering a lower side of said cab with a side cover; said cab being constituted by a hollow cab box having five vertically extending pillars including a left front pillar, a right front pillar, a left center pillar, a left rear pillar and a right rear pillar, and five side sections between said pillars including a front side section, a left front side section, a left rear side section, right side section and a rear side section, and a door openably or closeably fitted between said left front pillar and said left center pillar, characterized in that;

said door is a folding type door comprised of a first door panel pivotally supported on said left center pillar of said cab box by use of door hinges and a second door panel foldably and freely connected to said first door panel by use of intermediary hinges whereby said first and second panels form a substantially continuous arc and are freely movable with respect to each other during folding movement;

said folding type door being located substantially in the same vertical plane as said side cover;

a first holder member is attached to said first door panel and a separate second holder member is attached to said second door panel retaining said folding type door in an open door position when said folding type door is opened; and said left rear side section of said cab box being provided with two catch members located in spaced fore and rear positions to be attachably or detachably engaged with said first and second holder members when said folding type door is in an open door position.

2. A construction machine as defined in claim 1, wherein said left rear side section of said cab box is formed in a convex arcuate shape from said left center pillar to said rear pillar, and said folding type door is folded back along said left rear side section of said cab box when opened.

3. A construction machine as defined in claim 1, further comprising a stretchable protective cover to cover a gap between said two door panels of said folding type door.

4. A construction machine as defined in claim 1, wherein said left rear pillar of said cab is located at a position behind an operator's seat within said cab.

5. A construction machine as defined in claim 1, further comprising a door cushion member provided on said left rear side section on said cab which cushions said folding type door when said folding type door is retained in an open door position.

6. A construction machine as defined in claim 5 wherein said door cushion member comprises a bracket having a resilient cushion member attached thereto.

* * * * *